March 26, 1940.  W. F. BOLDT  2,194,584
SLACK ADJUSTER FOR BRAKES
Filed Aug. 29, 1938  2 Sheets-Sheet 1
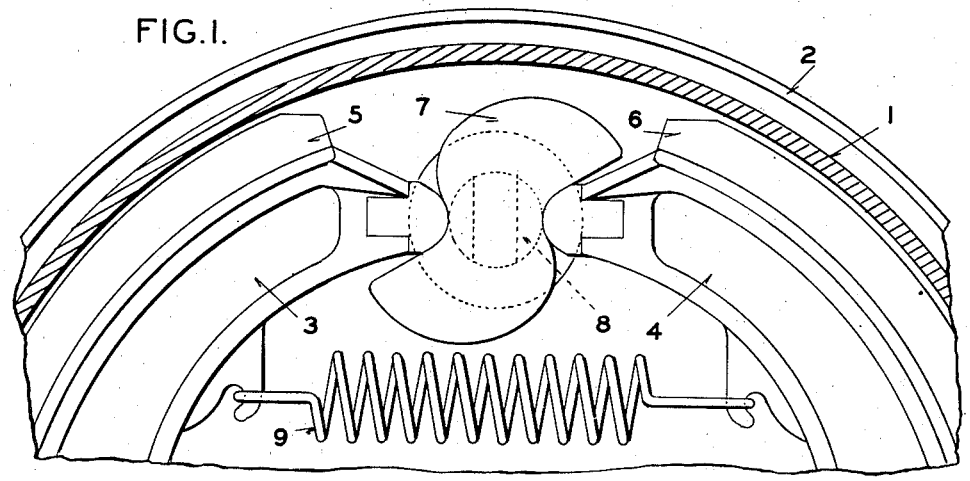
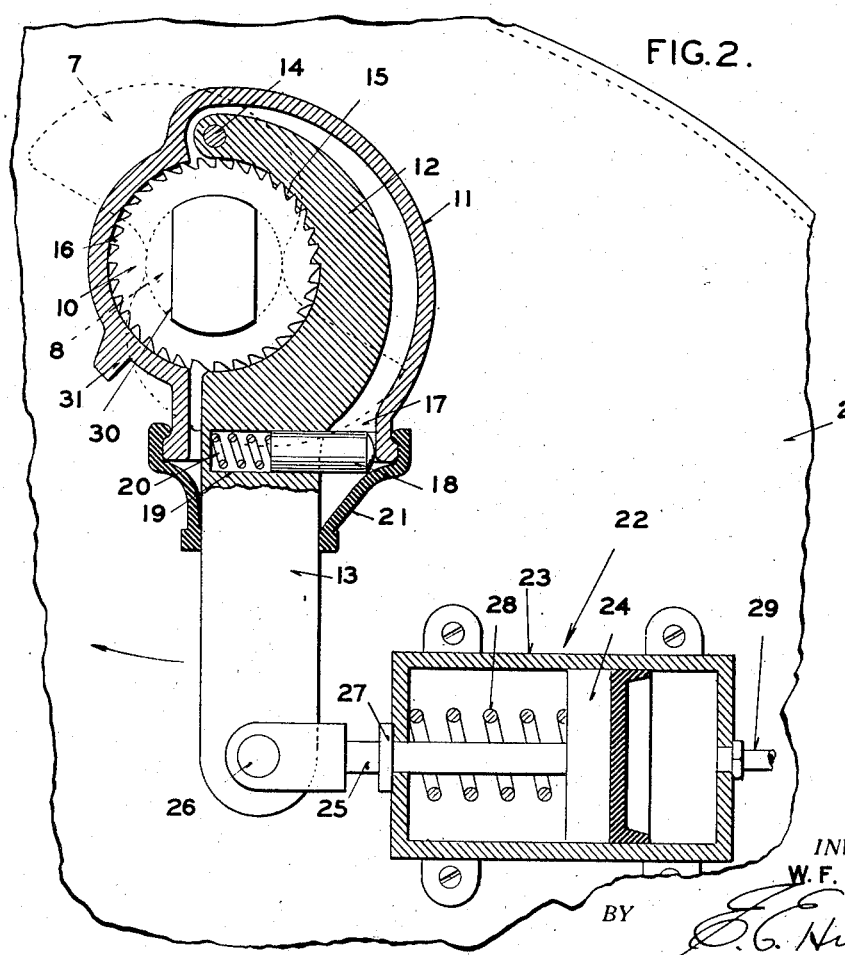
INVENTOR:
W. F. BOLDT
BY
ATTORNEY March 26, 1940.  W. F. BOLDT  2,194,584
SLACK ADJUSTER FOR BRAKES
Filed Aug. 29, 1938  2 Sheets-Sheet 2

INVENTOR:
W. F. BOLDT
BY
ATTORNEY

Patented Mar. 26, 1940

2,194,584

UNITED STATES PATENT OFFICE 2,194,584

SLACK ADJUSTER FOR BRAKES

Werner F. Boldt, Clayton, Mo., assignor to Wagner Electric Corporation, St. Louis, Mo., a corporation of Delaware Application August 29, 1938, Serial No. 227,283

10 Claims. (Cl. 188—79.5)

My invention relates to brakes and more particularly to slack adjusters therefor whereby the slack in the actuating means resulting from wear of the brake shoe lining may be taken up.

One of the objects of my invention is to provide a slack adjuster for a cam-operated brake which will permit the cam to be properly adjusted with respect to the actuating means and the brake shoes in order to compensate for wear of the brake shoe lining.

Another object of my invention is to so construct a slack adjuster that a mere manual rotation of the cam shaft is all that is necessary to take up the slack and properly reset the off position clearance of the brake shoes.

Still another object of my invention is to construct a simple, efficient and easily operable slack adjuster and one which will have a wide range of adjustment.

Figure 3:
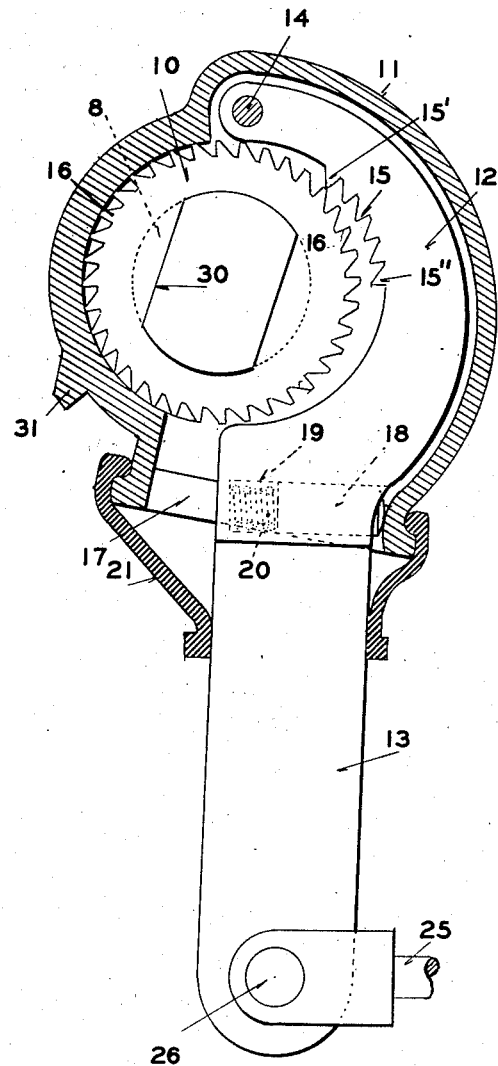

Other objects of my invention will become apparent from the following description taken in connection with the accompanying drawings in which Figure 1 is a view of a cam-operated brake with which my slack adjuster is shown as associated; Figure 2 is a view, partly in section, showing how the slack adjuster is interposed between the brake cam shaft and the actuator therefor; Figure 3 is a view of the slack adjuster showing the parts thereof in a position they assume during the adjusting operation; and Figure 4 is an end view of the slack adjuster.

Referring to the drawings in detail and particularly Figure 1, there is shown a portion of an S-cam actuated brake with which I have associated my novel slack adjuster. Numeral 1 indicates a drum which has its open side closed by a backing plate 2 and within the drum are the brake shoes 3 and 4 carrying linings 5 and 6. The shoes are adapted to be actuated into engagement with the drum by means of the S-cam 7 positioned between the free ends of the shoes, this cam being secured to the inner end of a cam shaft 8 journaled in the backing plate 2. The cam acts as an off position stop for the shoes when they are disengaged from the drum by the action of the retractile spring 9 connected to the ends of the shoes.

Figure 4:
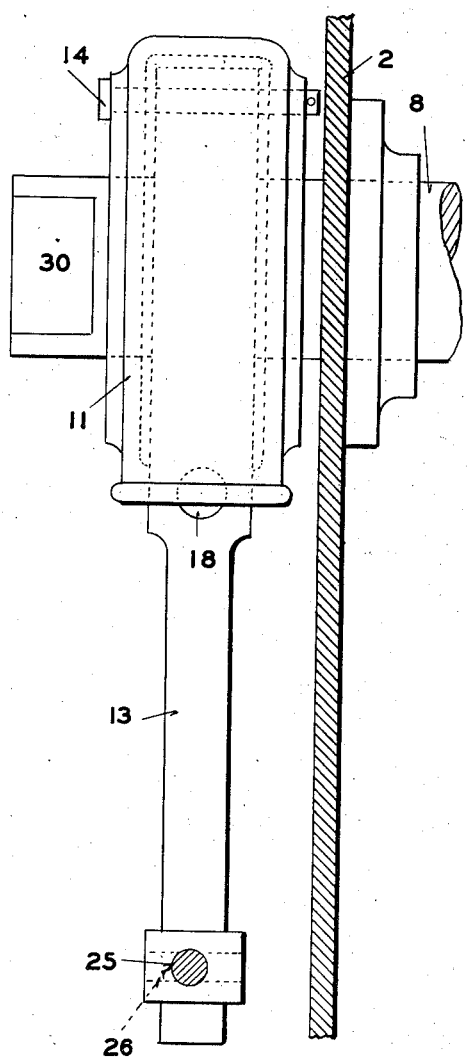

As shown in Figures 2, 3 and 4, the outer end of the cam shaft has secured thereto a toothed member 10 and surrounding this toothed member is a casing 11 rotatably mounted on the cam shaft. One side of the casing is enlarged to receive the curved upper portion 12 of an actuating lever 13 which is pivoted at the upper end to the casing by means of a pin 14. The radius of curvature of the upper portion of the lever that lies adjacent the toothed member is the same as the toothed member and this portion of the lever is provided with a plurality of teeth 15 for cooperation with the teeth 16 on the toothed member. The lower open end 17 of the casing through which the lever 13 projects is larger than the lever in order to permit the lever to have free relative movement with respect to the casing. The lever is normally biased to a position where the teeth 15 will engage with teeth 16, the biasing means comprising a plunger 18 slidable in a bore 19 in the lever and backed by a spring 20. A flexible dust excluding boot 21 surrounds the lower end of casing 11 and lever 13.

The lower end of lever 13 is shown as being actuated by a fluid motor 22 which comprises a cylinder 23 secured to the backing plate and a reciprocable piston 24 in the cylinder. A piston rod 25 connects the piston with the lower end of lever 13, the connection between the rod and lever being by means of pivot pin 26. The piston rod is provided with a shoulder 27 for engagement with the end of the cylinder when the piston is in inoperative position, the piston being biased in this position by the spring 28. The fluid motor may be operated by any type of fluid under pressure, as for example, air or liquid which is conveyed to the cylinder by the conduit 29.

The cooperating teeth 15 and 16 are of similar construction, the teeth 16 being formed with a straight radial face which is engaged by a similar straight face on the teeth 15, thus insuring maximum strength for these teeth which must assume the load when the lever 13 is rotated in a clockwise direction, as shown by the arrow in Figure 2, to actuate the brake shoes. The teeth 15 and 16 will normally remain in engagement with each other during the actuation of the cam by lever 13 since the retractile spring 9 on the brake shoes will cause the toothed member 10 on the cam shaft to return to its inoperative position as rapidly as that of lever 13 when fluid under pressure is released from the fluid motor 22.

When the brake linings 5 and 6 are new, the cam is so constructed that the proper running clearance will be present between the linings and the drum when the brake shoes are in their retracted position against the cam as shown in Figure 1. As the brake linings wear, it will be necessary to rotate cam 7 a greater angular distance than formerly in order to bring the linings into engagement with the drum and produce the braking action. This, of course, requires that lever 13 and the piston of the fluid motor 22 be moved a greater distance before any braking action will take place. Thus it is seen that there becomes present in the actuating mechanism, a definite amount of undesirable slack which may be so great that it is impossible to apply the brakes due to the piston not having sufficient movement. The slack should be taken up at regular intervals and in taking it up it is always necessary that the linings of the brake shoes do not become positioned too close to the drum when they are inoperative, thus permitting the drum to run "free". It is also desirable that this "running clearance" between the linings and the brake shoes be as uniform as possible for all of the brakes on the vehicle. If some manual means were employed, such as the well-known screw and worm, to adjust cam 7 with respect to the actuating lever 13, it would be necessary to first rotate cam 7 sufficiently to bring the linings into engagement with the drum and then to "back up" the cam to give the proper clearance. Since the person adjusting the mechanism has to depend upon his own ingenuity in determining the amount of "back up" which is necessary to give the cam, it generally happens that the "off" position clearance between the linings and drum are insufficient or not uniform for all the brakes on the vehicle.

By employing my invention I eliminate all the guess work in taking up the slack in the actuating mechanism. All that is necessary for the person adjusting the brakes is to manually rotate the cam shaft until the linings come into engagement with the drum and then release the cam shaft. The proper clearance will then be present and all the undesirable slack removed from the actuating mechanism.

In order to perform the adjusting operation, the outer end of the cam shaft is provided with a portion 30 having flats for receiving a spanner wrench. To make the adjustment, the wrench and shaft are rotated in a clockwise direction as seen in Figure 2 which will rotate cam 7 and bring the linings of the shoes into engagement with the drum. The rotation of the cam shaft also causes rotation of the toothed member 10. This will result in the teeth 16 on the toothed member having a camming action with the teeth 15 on the upper end of the lever, thereby causing the lever to swing in a clockwise direction about the pivot pin 26 at the lower end of the lever. Since the upper end of the lever is pivoted to the casing 11, the casing will also be rotated by the lever in a clockwise direction about the cam shaft. The upper end of lever 13 will be moved sufficiently by the camming action of the teeth that teeth 16 of the toothed member can slip past teeth 15 on the lever, the position of the parts under these conditions being shown in Figure 3.

When the cam shaft has been rotated sufficiently to cause the cam to bring the linings 5 and 6 into engagement with the drum, the cam shaft is released. Under these conditions the retractile spring 9 for the shoes will cause the ends of the shoes to act upon the curved surfaces of cam 7 and rotate the cam in a counter-clockwise direction carrying with it the toothed member 10. Since the teeth 15 are biased into engagement with the teeth 16 by the action of spring 20 and plunger 18, teeth 15 will be moved into their new cooperating relationship with the teeth 16 on the rotatable member and the parts will again assume the position shown in Figure 2.

It is to be especially noted that when the upper tooth 15' of the teeth 15 is just free to pass over the upper end of an adjacent tooth 16, it is possible for the toothed member 10 to have a predetermined counter-clockwise rotation before the straight surfaces of the teeth 15 and 16 come into engagement. This counter-clockwise movement of the toothed member is sufficient to allow cam 7 to permit the brake shoes 3 and 4 to move sufficiently away from the drum to establish the proper running clearance between the drum and the brake linings when the brake is not being actuated. In the event the toothed member 10 had been rotated to a position, in bringing the linings into engagement with the drum, where the lower tooth 15" of the teeth 15 is just capable of clearing its adjacent tooth 16, the toothed member 10 is still permitted to have sufficient counter-clockwise movement to permit the shoes to be properly withdrawn from the drum. As soon as tooth 15" clears the adjacent tooth 16, the spring-biased plunger 18 will swing the lever to a position where the teeth 15 and 16 are partially engaged. The return rotation of the toothed member 10 will now rotate the lever and the casing to their positions shown in Figure 2 where the teeth 15 become fully engaged with the teeth 16.

There is also provided on casing 11, a lug 31 for cooperation with a suitable tool whereby casing 11 may be held in the position shown in Figure 3, thus permitting the toothed member to be freely rotated in a counter-clockwise direction. Thus if it is desired to release the cam to its original position after the linings 5 and 6 have become worn out, this can be easily accomplished.

From the foregoing it is apparent that I have constructed a slack adjusting mechanism which is very easily operated and does not involve "guess work" to properly take up the slack in the actuating mechanism for the brake. A simple spanner wrench is the only tool necessary to perform the adjusting operation. A simple turning of the cam shaft and then releasing it insures that the slack will be taken up and the proper clearance established between the linings and the brake shoes. The construction permits a large number of teeth to be in abutting relationship when the actuating lever is being rotated to operate the cam to apply the brakes. Also the teeth do not need to be undercut to permit the proper "back up" to give the linings the necessary off position clearance. The construction is such that an unlimited degree of adjustment is possible since the toothed member 10 and the cam shaft may be rotated an unlimited number of degrees to take up the slack.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, an element for moving a brake shoe into engagement with the drum, an actuating element for operating the first named element, and means connecting the elements together and embodying means for taking up the slack and for automatically setting said shoe so that it is not less than a predetermined distance from the drum when in its normally inoperative position, said connecting means comprising parts carried by one of said elements and a part carried by the other element and engageable with the other parts, said parts being so mounted and associated with each other that the one part will be moved out of engagement with one of the other parts it is cooperating with and into engagement with another part when the first named element is manually moved relative to the second element and to a position placing the shoe in engagement with the drum and then subsequently released, said parts also being so formed and related to each other that when the first element is released it will be permitted to have a reverse relative movement to the second element.

2. In braking apparatus, an element for moving a brake shoe into engagement with the drum, an actuating element for operating the first named element, and means connecting the elements together and embodying means for taking up the slack and for automatically setting said shoe so that it is not less than a predetermined distance from the drum when in its normally inoperative position, said connecting means comprising teeth carried by one of said elements and a tooth carried by the other element and engageable with the other teeth, said teeth being so mounted and associated with each other that the one tooth will be moved out of engagement with the tooth it is cooperating with and into engagement with another tooth when the first named element is manually moved relative to the second element and to a position placing the shoe in engagement with the drum and then subsequently released, said teeth also being so formed and related to each other that when the first element is released it will be permitted to have a reverse relative movement to the second element.

3. In braking apparatus, an element for moving a brake shoe into engagement with the drum, an actuating lever for operating the first named element, and means connecting the element and the lever together and embodying means for taking up the slack and for automatically setting said shoe so that it is not less than a predetermined distance from the drum when in its normally inoperative position, said connecting means comprising teeth carried by said element and a tooth carried by the lever and engageable with the other teeth, means for so mounting the lever that it can move relatively away from the element whereby the one tooth will be moved out of engagement with the tooth it is cooperating with and into engagement with another tooth when the element is manually moved relative to the lever and to a position placing the shoe in engagement with the drum and then subsequently released, said teeth also being so formed and related to each other that when the element is released it will be permitted to have a reverse relative movement to the lever.

4. In braking apparatus, a drum, a brake shoe for cooperating with the drum, an element for actuating the brake shoe, a shaft connected to the element having a member thereon provided with teeth, an actuating lever for rotating the shaft and having a tooth thereon for cooperating with one of the first named teeth, and means whereby said shaft may be manually rotated relatively to the lever and in a brake applying direction to cause the tooth thereon to cooperate with a different tooth on said member, said teeth being so formed and associated with each other that when the new relation is assumed the brake shoe will automatically assume a normally inoperative position that is not less than a predetermined distance from the drum when the lever is in its normally inoperative position.

5. In braking apparatus, a drum, a pair of brake shoes for cooperating with the drum, a cam for actuating the brake shoes, a cam shaft having a member thereon provided with teeth, an actuating lever for rotating the cam shaft and having a tooth thereon for cooperating with one of the first named teeth, and means whereby said cam shaft may be manually rotated relatively to the lever in a brake applying direction to cause the tooth thereon to cooperate with a different tooth on said member, said teeth being so formed and associated with each other that when the new relation is assumed the brake shoes will automatically assume a normally inoperative position that is not less than a predetermined distance from the drum when the lever is in its normally inoperative position.

6. In braking apparatus, a drum, a pair of brake shoes for cooperating with the drum, a cam for actuating the brake shoes, a cam shaft having a toothed member thereon, an actuating lever having teeth thereon for cooperating with one of the first named teeth, and means operable by a manual rotation of the cam shaft relative to the lever and in a brake applying direction for causing said cooperating teeth to assume a different cooperating relationship, said teeth being so formed and related to each other that when in their new relation said shoes will automatically assume a normally inoperative position closer to the drum but free of engagement with the drum when the cam shaft is released.

7. In braking apparatus, a drum, a pair of brake shoes for cooperating with the drum, a cam for actuating the brake shoes, a cam shaft having a member thereon provided with teeth, an actuating lever for rotating the cam shaft and having teeth thereon for cooperating with the teeth on said member, and means for manually rotating said cam shaft and member thereon relative to the lever in a brake applying direction to cause the cooperating teeth to assume a different cooperating position, said teeth being so formed and related to each other that when in their new positions and the cam assumes its inoperative position the shoes will automatically assume a position not less than a predetermined distance from the drum.

8. In braking apparatus, a drum, a pair of brake shoes for cooperating with the drum, a cam for actuating the brake shoes, a cam shaft, a toothed member secured to said cam shaft, a member rotatably mounted on the cam shaft adjacent the toothed member, a lever pivoted to the rotatable member and provided with teeth for cooperating with the teeth of the toothed member, and means for manually rotating said cam shaft and toothed member relatively to the lever and causing the teeth of the latter to assume a new position with respect to the teeth on the toothed member, said rotatable member having relative movement with respect to both the cam shaft and the lever when the cam shaft is rotated.

9. In braking apparatus, a drum, a pair of brake shoes for cooperating with the drum, a cam for actuating the brake shoes, a cam shaft, a toothed member secured to said cam shaft, a member rotatably mounted on the cam shaft adjacent the toothed member, a lever pivoted at one end to the rotatable member and provided with a curved portion having teeth for cooperating with the teeth of the toothed member, means pivotally connected to the other end of the lever for rotating the lever to actuate the cam, and means for manually rotating the cam shaft and the toothed member to thereby cause said lever to be swung about its said other end and the rotatable member to be so moved with the lever as to permit the teeth on the lever to assume a new relation with teeth on the toothed member.

10. In braking apparatus, a drum, a pair of brake shoes for cooperating with the drum, a cam for actuating the brake shoes, a cam shaft, a toothed member secured to said cam shaft, a member rotatably mounted on the cam shaft adjacent the toothed member, a lever pivoted to the rotatable member and provided with teeth for cooperating with the teeth of the toothed member, said lever adapted to have relative movement with respect to the rotatable member, biasing means cooperating with the lever and the rotatable member for normally holding the teeth on the lever in engagement with the teeth of the toothed member, and means for manually rotating said cam shaft and toothed member in a direction to cause the teeth of the latter to assume a new cooperating relation with the teeth on the lever, the rotation of the cam shaft causing the rotatable member and the lever to have relative movement with respect to each other and against the biasing means whereby the teeth on the lever may assume their new cooperating relation with the teeth of the toothed member.

WERNER F. BOLDT.